United States Patent Office 3,300,455
Patented Jan. 24, 1967

3,300,455
POLYMERS OF VINYL CHLORIDE AND CERTAIN POLYMERIZABLE ALIPHATIC ETHERS CONTAINING ESTER GROUPS
Jay A. Gervasi, Raleigh, N.C., and Lucian W. McTeer, South Charleston, W. Va., assignors to Union Carbide Corporation, a corporation of New York
No Drawing. Filed Aug. 1, 1962, Ser. No. 213,853
6 Claims. (Cl. 260—87.1)

The present invention is concerned with improved vinyl chloride polymers, and is especially concerned with heteropolymers of vinyl chloride and certain polymerizable aliphatic ethers containing both ethylenically unsaturated and ester groups, such groups being separated in the monomer by an ether linkage. This invention is also concerned with coated articles containing as the coating thereon a film of a heteropolymer of this invention.

Homopolymers of vinyl chloride are well known to the art, and are characterized, for instance, by excellent chemical-, electrical-, flame-, weather-, and corrosion resistance, etc. The possession of such properties renders the polymers adaptable to use as protective coatings, for example, wherein the articles for which protection is desired are coated with a film of the polymer. Unfortunately, however, such polymers are in themselves relative brittle. Thus a plasticizer is conventionally incorporated therewith in order to produce relatively flexible films of the polymer. The plasticized polymers can then be employed to produce coatings on articles for use as cable insulation, sheathing, etc. Coated paper products having improved flame resistance can also be obtained. Moreover, such polymers are finding increased usage in the production of laminates with various substrates, particularly metal such as steel, aluminum, magnesium, and copper, the laminates being subsequently employed as duct work, luggage, instrument cases, automotive parts, machine housings, or wherever structural rigidity combined with the aforementioned resistance properties of vinyl chloride polymers is desired.

Nevertheless, the use of a plasticizer in order to produce more flexible films from the polymer has not met with complete satisfaction. For instance, conventional plasticizers, such as dibutyl phthalate, etc., have a tendency to leach out in conventional solvents from which the films are frequently cast. Thus, a more brittle product is ultimately formed. In addition, the adhesion of poly(vinyl chloride) films to certain substrates, such as steel and other ferrous metals, is often insufficient for many applications, particularly where permanent coatings are desired.

It has now been found that improved vinyl chloride polymers can be obtained by the copolymerization of vinyl chloride with a minor amount, i.e., from 1 to about 30 percent, and preferably from 5 to about 20 percent by total weight of at least one polymerizable aliphatic ether of the formula

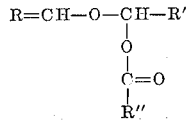

wherein R designates an alkylidene radical containing from 1 to about 8 carbon atoms and preferably from 1 to 4 carbon atoms, such radical being connected to the adjacent carbon atom through an ethylenically unsaturated carbon atom thereof; R' designates an alkyl radical containing from 1 to about 8 carbon atoms and preferably from 1 to 4 carbon atoms, and which more preferably contains the same number of carbon atoms as the radical R and is otherwise structurally identical therewith save both in the nature of the bond by which it is connected to the adjacent carbon atoms, i.e., through a saturated carbon atom, and inherently therefore, in the possession of an additional hydrogen atom in the 2-position with respect to the etheric oxygen atom; and R'' independently designates an alkyl radical containing from 1 to about 8 carbon atoms and preferably from 1 to 4 carbon atoms. In addition, the radicals R, R' and R'' can also be substituted by groups such as alkoxy radicals and preferably lower alkoxy radicals containing from 1 to 4 carbon atoms, halogen atoms, such as chlorine atoms, etc., within the contemplation of this invention as herein disclosed.

The polymers of this invention find general use in the many applications in which poly(vinyl chloride) is conventionally employed, and espectially in the production of films and coatings, and in any given use will ordinarily have the desirable resistance characteristics of poly(vinyl chloride). At the same time, the polymers of this invention, having as a component thereof a polymerized monomer containing both ether and ester linkages, advantageously are more flexible than poly (vinyl chloride), and also more adherent to shaped substrates such as metals, particularly ferrous metals, thereby rendering such products particularly useful as permanent coatings, etc.

As illustrative of the polymerizable aliphatic ethers contemplated by this invention as comonomers, there can be mentioned:

Vinyl 1-formoxyethyl ether
Vinyl 1-acetoxyethyl ether
Vinyl 1-propionoxyethyl ether
Vinyl 1-(3-ethoxypropionoxy)ethyl ether
Vinyl 1-butyroxyethyl ether
Vinyl 1-(3-methoxybutyroxy)ethyl ether
Vinyl 1-(2-ethylbutyroxy)ethyl ether
Vinyl 1-(2-methylpentanoxy)ethyl ether
Vinyl 1-(2-ethylhexoxy)ethyl ether
1-propenyl 1-acetoxypropyl ether
3-ethoxy-1-propenyl 1-acetoxy-3-ethoxypropyl ether
1-propenyl 1-(2-methylpentanoxy)propyl ether
1-propenyl 1-(2-ethylhexoxy)propyl ether
Isobutenyl 1-acetoxyisobutyl ether
1-butenyl 1-propionoxybutyl ether
3-methoxy-1-butenyl 1-acetoxy-3-methoxybutyl ether
2-methyl-1-pentenyl 1-acetoxy-2-methylpentyl ether
2-ethyl-1-hexenyl 1-acetoxy-2-ethylhexyl ether
1-butenyl 1-butyroxybutyl ether, and the like.

The polymerizable aliphatic ethers can be obtained initially by the liquid phase pyrolysis of a di(acyloxyaliphatic) ether in accordance with the equation:

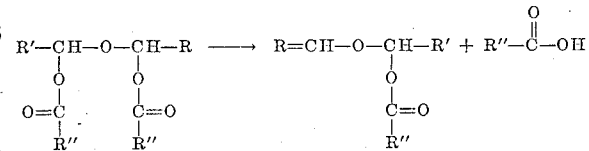

wherein R, R' and R'' are as defined above, such that at least one of the radicals, R' is connected to the adjacent carbon atom by a hydrogen-containing carbon atom, i.e., a primary or secondary carbon atom. The pyrolysis is carried out at a temperature maintained generally in the range of from about 160° C. to about 240° C. Preferably, the reaction temperature is maintained between about 180° C. and about 220° C. Slightly higher or lower temperatures can also be employed. However, at temperatures substantially below about 160° C., the resulting rate of pyrolysis is generally too slow to warrant the commercial application of the process, while at temperatures appreciably above about 240° C., undesirable side reactions may occur to an extent such that the yield of the desired product is materially reduced. A conventional polymerization inhibitor, such as hydroquinone, and alkylhydroquinone ether, phenothiazine, tert-butyl catechol, etc., can also be incorporated in the reaction mixture. Under such circumstances, the polymerization inhibitor is ordinarily incorporated in the reaction mixture in a concentration of from about 0.01 percent to about 1 percent by weight based upon the weight of the reactant, although higher or lower concentrations can also be utilized.

During the pyrolysis reaction, the product, comprising an equimolar mixture of the polymerizable aliphatic ether and a monocarboxylic acid, is preferably removed from the reaction mixture as rapidly as it is formed or evolved and is subsequently resolved into its individual components without undue delay. A procedure of this nature precludes to a substantial extent the recombination of the ether and acid products which may otherwise occur, especially at elevated temperatures. A particularly convenient and broadly applicable method for resolving the product mixture when a water-soluble acid is present, for example, involved extracting the mixture with water and a suitable hydrocarbon solvent for the ether, such as heptane, benzene, ethyl acetate, chlorinated hydrocarbons such as chloroform, etc. The ether product can then be recovered from the hydrocarbon layer by conventional distillation. When a substantial difference exists between the boiling points of the ether and acid products, the product mixture can also be distilled, ordinarily under reduced pressure, in the absence of any preliminary extraction procedure. Other convenient methods for resolving the product mixture will also occur to those skilled in the art and can satisfactorily be utilized.

In practice, the di(acyloxyaliphatic) ether is charged to a suitable reactor, such as a kettle equipped with a distillation column, and is heated therein to a temperature maintained within the operable range hereinabove described. Preferably, the pyrolysis of the di(acyloxyaliphatic) ether is carried out by maintaining the reaction temperature within the kettle at about the boiling point of the di(acyloxyaliphatic) ether. By carrying out the pyrolysis at the boiling point of the di(acyloxyaliphatic) ether, the rapid removal of the lower boiling ether and acid products as a distillate during the process can readily be effected. In this connection, a suitable method for controlling the boiling point of the di(acyloxyaliphatic) ether within the operable reaction temperature range hereinabove described lies in the control of the pressure maintained within the reaction system. Thus, for example, the pyrolysis of di(acetoxyethyl) ether is conveniently conducted at atmospheric pressure since the boiling point of the ether at atmospheric pressure is 190° C., a temperature at which the pyrolysis can be carried out with highly satisfactory results. Higher or lower pressures can also be utilized but preferably are not sufficiently high or low so as to bring the boiling point of the ether reactant outside of the operable temperature range for the reaction. Similarly, di(acyloxyaliphatic) ethers of higher molecular weight may require the use of subatmospheric pressure if the reaction is to be conducted at the boiling point of the ether reactant, while superatmospheric pressures may best be employed in connection with di(acyloxyaliphatic) ethers of lower molecular weight. In addition to carrying out the pyrolysis at the boiling point of the di(acyloxyaliphatic) ether, it is to be noted that the reaction can be performed at temperatures within the operable range indicated above, and below the boiling point of the di(acyloxyaliphatic) ether by removing the gaseous reaction products using an entraining agent such as an inert gas, as for example, nitrogen, methane, helium, etc., and the like.

The degree of rectification employed in the distillation column should be sufficient to separate the product mixture from unreacted di(acyloxyaliphatic) ether which also ascends the distillation column in varying amounts depending upon the operating conditions utilized. However, the degree of rectification preferably should not be sufficient to separate the polymerizable aliphatic ether from the monocarboxylic acid produced therewith since one of the components of the product mixture would then be concentrated in the distillation column and eventually forced back into the kettle, thereby resulting in a drop in the kettle temperature. The efficiency of the distillation column and the ratio of reflux required to effect the desired degree of rectification will vary broadly. Good results have been obtained, for example, using distillation columns of from 10 to 30 theoretical plates operating at reflux ratios of from 1 to 1 up to 5 to 1, although the process of the invention is not limited thereto. Upon completion of the reaction, the distillate can be subjected to any of the separation techniques hereinabove described so as to recover the polymerizable aliphatic ether as a substantially pure product.

Moreover the pyrolysis reaction can be carried out either batchwise or as a continuous operation. A continuous operation, wherein the di(acyloxyaliphatic) ether is continuously fed to a reactor over extended periods of time and subjected to pyrolysis therein, accompanied by the continuous removal of products, represents particularly efficient procedures and is possible on a commercially practicable basis because of the substantially complete conversion of the di(acyloxyaliphatic) ether with high efficiency to lower boiling products.

The polymerizable aliphatic ether products can thereafter be employed to produce the improved polymers of this invention as hereinbelow described.

As illustrative of the di(acyloxyaliphatic) ethers from which the polymerizable aliphatic ethers contemplated by this invention can be obtained, there can be mentioned:

Di(1-acetoxyethyl) ether
Di(1-propionoxyethyl) ether
Di[1-(3-ethoxypropionoxy)ethyl] ether
Di(1-butyroxyethyl) ether
Di[1-(3-methoxybutyroxy)ethyl] ether
Di[1-(2-ethylbutyroxy)ethyl] ether
Di[1-(2-methylpentanoxy)ethyl] ether
Di[1-(2-ethylhexoxy)ethyl] ether
Di(1-acetoxypropyl) ether
Di(1-acetoxy-3-ethoxypropyl) ether
Di[1-(2-methylpentanoxy)propyl] ether
Di[1-(2-ethylhexoxy)propyl] ether
Di(1-propionoxy-n-butyl) ether
Di(1-acetoxyisobutyl) ether
Di(1-acetoxy-3-methoxy-n-butyl) ether
Di(1-butyroxy-n-butyl) ether
Di(1-acetoxy-2-methylpentyl) ether
Di(1-acetoxy-2-ethylhexyl) ether,
and the like.

The di(acyloxyaliphatic) ethers can themselves be obtained initially by the liquid phase reaction of an aliphatic aldehyde with a monocarboxylic acid anhydride in accordance with the equation

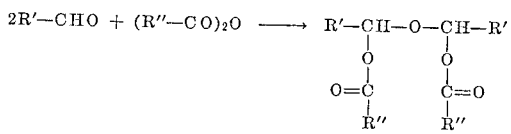

wherein R' and R" are as defined above.

The aliphatic aldehydes suitable for use in this reaction include, for example, ethanal, propanal, 3-ethoxypropanal, n-butanal, isobutanal, 3-methoxy-n-butanal, 3-ethoxy-n-butanal, 2-methylpentanal, 2-ethylhexanal, and the like. Moreover, in addition to these monomeric aldehydes, the cyclic polymers of the lower molecular weight aldehydes, such as para-acetaldehyde, can also be utilized. In like illustrative manner, the monocarboxylic acid anhydrides suitable for use as a reactant include the anhydrides of acetic acid, propionic acid, 3-ethoxypropionic acid, butyric acid, 3-methoxybutyric acid, 2-ethylbutyric acid, 2-methylpentanoic acid, 2-ethylhexanoic acid, and the like. In this connection, it is to be noted that, while mixtures of aliphatic aldehydes and/or the anhydrides of mixed monocarboxylic acids can be employed as reactants, whereby asymmetrical di(acyloxyaliphatic) ethers wherein R' and/or R" represent more than one type of radical within the meanings hereinabove described are obtained, the use of such mixtures as reactants is preferably avoided since the multiplicity of products thus formed are often separated only with difficulty. This has been found to be true especially when an anhydride of mixed carboxylic acids is employed as a reactant. Furthermore, the anhydrides of mixed carboxylic acids are not readily available commercially, and require initial preparation. Hence, the production of asymmetrical di(acyloxyaliphatic) ethers containing more than one type of acyloxy radical by the reaction of an aliphatic aldehyde with a mixed carboxylic acid anhydride represents a somewhat more complex and less convenient process.

The reaction between the aliphatic aldehyde and the monocarboxylic acid anhydride is ordinarily carried out in the presence of a catalytic amount of an acidic catalyst if a significant quantity of a di(acyloxyaliphatic) ether is to be produced within an efficient period of operation. As employed herein, the term "acidic catalyst" is meant to include substances which, broadly speaking, are strongly acidic materials, such as the inorganic and organic acids characterized by having an ionization constant "K" approximately equal to, or greater than the first ionization constant of phosphoric acid, viz. $7.5 \times 10^{-3}$, the acid-reacting salts of the Friedel-Crafts type, as well as other acid salts which react in situ under the operating conditions utilized to generate strongly acidic materials. Inorganic acids which are suitable for use as a catalyst for example, include sulfuric acid, hydrochloric acid, chlorosulfonic acid, chlorosulfinic acid, hydrobromic acid, hydriodic acid, sulfurous acid, orthophosphoric acid and the like. Organic acids which can be employed as the acidic catalyst include, among others, dichloroacetic acid, trichloroacetic acid, picric acid, arylsulfonic acids such as para-toluene-sulfonic acid, and the like. Acid-reacting salts of the Friedel-Crafts type which can be utilized as the acidic catalyst include, among other, zinc chloride, stannic chloride, aluminum chloride, and the like. Other acid salts which can be utilized in this respect include, among others, sodium bisulfate, potassium bisulfate, and the like. In addition, iodine has also been found suitable for use as an acidic catalyst within the scope of this invention.

Of the acidic catalysts, the strong mineral acids find general and preferred usage. Of these, the use of sulfuric acid is particularly preferred in that lower concentrations of catalyst can be employed effectively when using sulfuric acid, as compared with the other acidic catalysts. However, the catalyst preference may vary, depending, for example, upon the identity of the aldehyde and/or anhydride undergoing reaction, or upon the operating conditions under which the reaction is carried out.

The amount of acidic catalyst to be used can be varied widely, and will depend to a certain extent upon the identity of the catalyst, particularly upon the acidic strength of the catalyst, and upon the particular aldehyde and/or anhydride undergoing reaction, as well as upon the operating conditions under which the reaction is carried out. For instance, with the acidic catalysts such as the strong mineral acids, concentrations up to about 2 percent by weight of the total reactants are generally quite effective, while somewhat greater amounts of the less strongly acidic catalysts can be employed advantageously. Little additional advantage may be realized, however, by the use of the acidic catalyst in an amount substantially in excess of about 2 percent by weight of the total reactants. Moreover, such higher catalyst concentrations, while effective, may tend to engender the formation of unwanted by-products. In this respect, a general range within which the concentration of the acidic catalyst can be varied satisfactorily is from about 0.01 percent to about 5 percent by weight of the total reactants, with catalysts concentrations of from about 0.05 percent to about 1 percent by weight of the total reactants being preferred. Somewhat greater or lesser amounts of the acidic catalyst can also be utilized in accordance with this invention, such catalytic amounts being readily determinable by one skilled in the art in light of this disclosure.

An inert diluent for either or both reactants can also be employed if desired, and is in fact preferred if the reactants are not completely miscible under operating conditions, notwithstanding the fact that the presence of a diluent may tend to retard the rate of reaction. Suitable inert diluents include, by way of illustration, dioxane, aliphatic hydrocarbons such as n-heptane, aromatic hydrocarbons such as benzene, ethers such as dibutyl ether and diethylene glycol dimethyl ether, ketones such as acetone, and the like. When desired, the diluent is preferably employed in an amount just sufficient to provide a complete solvent for the reactants, although greater or lesser amounts of diluent can also be utilized.

In practice, the reaction between the aliphatic aldehyde and the monocarboxylic acid anhydride is necessarily carried out in a manner assuring the absence of an excess of the anhydride at all times during the course of the reaction. To this end, both the proportions in which the reactants are employed and the method by which the reactants are introduced are of critical importance to the process. Thus, by way of illustration, particularly good results can be obtained, measurable in terms of high yields and efficiencies, by employing a substantial molar excess of the aldehyde as a reactant, and preferably, a proportion of from about 2 moles to about 10 moles of the aldehyde for each mole of the anhydride undergoing reaction. Higher mole ratios of aldehyde to anhydride can also be utilized, but are generally accompanied by little additional advantage. On the other hand, at least an equimolar ratio of aldehyde to anhydride must be employed. Moreover, the reaction can be perfromed by either the addition of the anhydride to the aldehyde, or by the simultaneous addition of the reactants to a suitable reactor, in each case employing the reactants in proportions as hereinabove described. However, the addition of the aldehyde to the anhydride, as in the case of using a molar excess of the anhydride as a reactant, has been found unfavorable to the production of di(acyloxyaliphatic) ethers and is therefore to be avoided. The acidic catalyst can be introduced to the reaction mixture by incorporation in either or both of the reactants, or, in a less preferred manner due to the exothermic nature of the reaction, by subsequent addition of the catalyst to a mixture of the reactants. Similarly, a diluent when employed, can be introduced to the reaction mixture with either or both of the reactants, or to a mixture of the reactants.

The practice of adding the anhydride to the aldehyde ordinarily establishes a very high mole ratio of aldehyde to anhydride in the reaction mixture for at least a part of the reaction period, depending upon the rapidity of the addition. Such a procedure therefore generally finds preferred application when a cyclic, polymeric aldehyde, such as paraacetaldehyde, is employed as a reactant or when the acidic catalyst is incorporated in a lower molecular monomeric aldehyde prior to the introduction of the reactants, the presence of the catalyst in such an aldehyde tending to engender the formation of the cyclic, polymeric aldehyde. Under such conditions, the monomeric aldehyde is slowly evolved from the cyclic, polymeric form and care must be taken to see that the anhydride is not added faster than the rate of evolution of the monomeric aldehyde. The simultaneous addition of the reactants to a suitable reactor is, on the other hand, preferred in most other instances. The two reactants may advantageously be mixed and fed as a single stream or, if desired, fed as two separate streams. A particularly preferred procedure in this connection involves the initial preparation of a mixture of all of the aldehyde and a major portion, for example from about 75 percent to about 90 percent, of the anhydride. In the absence of the acidic catalyst, a significant reaction will not occur within this mixture. A second mixture consisting of the remainder of the anhydride and all of the catalyst is also prepared, and the two mixtures subsequently fed to a reactor preferably at constant rates proportional to their volume. The latter procedure ensures the maintenance of a fairly constant mole ratio of the reactants even though the rate of feed of one or both of the mixtures varies slightly, an advantage which does not prevail when the anhydride is added to the aldehyde.

The exothermic reaction between the aliphatic aldehyde and the monocarboxylic acid anhydride is quite vigorous and ordinarily takes place as fast as the reactants and the catalyst can be mixed and the heat of reaction removed. Moreover, the reaction is, in most cases, so rapid under the conditions employed that it can be carried out efficiently either batchwise or on a continuous basis. The continuous procedure proves particularly applicable when low molecular weight aldehydes and anhydrides, that is wherein R and $R^1$ defined above in connection with Equation I contain up to about three carbon atoms, are employed as reactants.

The temperature of the reaction mixture is generally maintained at a temperature of from about 0° C., or slightly lower, to about 150° C., or slightly higher, by cooling the reaction mixture using any suitable means and/or by controlling the overall rate of feed of the reactants. Preferably, the temperature of the reaction mixture is maintained in this manner in the range of from about 25° C. to about 100° C. At temperatures substantially below about 0° C., the resulting rate of reaction may be too slow to warrant commercial application of the process, while at temperatures appreciably above about 150° C., undesirable side reactions may occur to an extent such that the yield of the desired product is materially reduced.

Pressure has not been found critical to the reaction. Hence, for example, either atmospheric pressure or superatmospheric pressure can be employed with advantage. In addition, subatmospheric pressure consistent with a predominantly liquid phase reaction can also be employed.

After the feed of the reactants has been completed, the exothermic reaction is ordinarily allowed to continue until the heat of reaction ceases to be evolved. Although the reaction is substantially complete as soon as the reactants and the catalyst have been mixed, it is preferred to permit the reaction mixture to stand for an additional period of from about 1 to about 3 hours or more after the mixing is complete in order to obtain the highest product yields.

Upon completion of the reaction producing the di(acyloxyaliphatic) ether, the acidic catalyst is generally removed or neutralized by the addition of a suitable agent such as an alkali metal- or ammonium hydroxide, carbonate, bicarbonate or acetate, etc., and the like. A combination of soduim hydroxide and sodium thiosulfate has, for instance, proven particularly effective in the neutralization of a hydriodic acid catalyst. The removal or neutralization of the acidic catalyst in this manner serves, for example, to prevent the reversion of the di(acyloxyaliphatic) ether product to the original reactants during subsequent separation. Moreover, if the neutralizing agents are introduced in aqueous soultion, the amount of water added should be kept to a minimum so as to minimize or obviate the hydrolysis of any unreacted anhydride or of the di(acyloxyaliphatic) ether product. Thereafter, the di(acyloxyaliphatic) ether product can be recovered from the neutralized reaction mixture and separated from any unreacted material, as well as any aldehyde diacylate which may be produced as a by-product therewith, by any suitable means, such as by vacuum distillation. In this manner, the di(acyloxyaliphatic) ether is also separated from any minor quantities of aliphatic acid which may be formed as a by-product therewith by hydrolysis.

The di(acyloxyaliphatic) ether products can thereafter be employed to produce the polymerizable aliphatic ethers contemplated by this invention, from which the improved polymers of this invention are then subsequently obtained.

More particularly, the polymers of this invention can be obtained by the conventional polymerization of vinyl chloride with from about 1 to about 30 percent and preferably from about 5 to about 20 percent by weight of the polymerizable aliphatic ether based upon the total weight of monomers charged. The use of such proportions, it has been found, results in the formation of polymers in which the proportion of polymerized monomers falls within approximately the same weight ratio. In addition minor amounts of other copolymerizable monomers, such as maleic anhydride, acrylic acid, vinyl acetate, vinylidene chloride, methyl methacrylate, tetrafluoroethylene, etc., may also be incorporated without adversely affecting the improved physical properties of the product.

The polymers of this invention are readily produced at temperatures of from about 0° C. to about 100° C. and preferably from about 10° C. to about 60° C. by any of the usual polymerization processes. Thus, by way of illustration, bulk polymerization can be employed in which the monomers are mixed together with a polymerization catalyst and reacted at a temperature at which polymerization will occur. Emulsion and suspension polymerization processes can also be employed. These latter processes, as is known, are carried out in aqueous medium and generally employ free-radical-type polymerization catalysts, together with emulsifying or suspending agents. Alternatively, solution polymerization can instead be used, in which case the monomers are dissolved in a suitable solvent and polymerized in contact with a polymerization catalyst. The catalysts employed are the conventional polymerization catalysts known in the art, such as the alkali metal persulfates, the peroxides, the alkali metal bisulfites, azo compounds, such as azodiisobutyronitrile, and the like.

Among the emulsifying and suspending agents which can be used there can be mentioned the common soaps, such as potassium stearate, potassium palmitate, potassium laurate, etc.; the sulfonated hydrocarbons, such as sulfonated alkanes, sulfonated alkylbenzenes, sulfonated naphthalenes, etc.; the amine soaps, such as the salts of triethanolamine; the salts of formaldehyde-condensed alkyl-aryl sulfonic acids; sulfonated succinic esters; and the like.

Suitable solvents include, for example, acetone, heptane, diisopropyl ether, acetonitrile, N,N-dimethylformamide, N,N-dimethylacetamide, dimethyl, sulfoxide, and the like, depending, for instance, upon the particular monomers undergoing polymerization. In some instances, the presence of a small amount of water may also be desirable to aid solution. Moreover, up to about one percent or more of a chain terminator, as for instance, tertiary dodecyl mercaptan, 2-mercaptoethanol, thiourea, or the like, can also be added to the polymerization reaction mixture, if desired, to assist in regulating the molecular weight of the resulting polymer.

After the polymerization is completed, the polymer can be recovered and dried, if desired, by conventional procedures. Moreover, either before or after recovery, one can add pigmenting agents, light stabilizers, heat stabilzers, oxidation inhibitors, etc., to the polymer.

The average molecular weight of the normally solid polymers thus obtained can be ascertained in conventional manner by measuring their specific viscosities. The specific viscosity of a polymer, as is well known to those skilled in the polymer art, is determined by the molecular weight of the polymer and is directly proportional thereto. More particularly, the specific viscosity of the polymers of this invention is ordinarily at least about 0.02, and most frequently, in the range of from about 0.1 to about 0.2. These values are determined at 20° C. using a size 100 Ubbelohde viscosometer from a solution of 0.2 gram of the polymer in 100 milliliters of N,N-dimethylformamide, and are calculated in accordance with the following formula:

Specific viscosity=

$$\left[\frac{\text{Viscosity of polymer solution}}{\text{Viscosity of solvent}}\right] - 1$$

The polymers of this invention are generally substantially, if not completely, soluble in the organic solvents hereinabove described, and from such solution can, for instance, be used to cast flexible films or coatings on any suitable substrate. Moreover, in this connection, when a metal substrate, and particularly a ferrous metal substrate, is employed, especially adherent films or coatings are obtained. Conventional modifiers, such as stabilzers, plasticizers, etc., can also be incorporated with the polymers, if desired, for use as coatings, or in any other application as hereinabove described.

The invention can be illustrated further by the following specific example:

The polymerization vessel employed in this example was a heavy-walled glass tube, 1 inch x 8 inches, of approximately 50 milliliters capacity, with a rimmed top. Twenty milliliters of distilled water were charged to the tube and 0.10 gram of dibasic potassium phosphate was dissolved therein. This solution was sparged with nitrogen for 30 minutes. The sparging was discontinued and 0.30 gram of dioctyl sodiumsulfosuccinate was added to the solution. The resulting was frozen by placing the tube in a Dry Ice/acetone mixture, and 0.03 gram of potassium persulfate was then added to the solution in the tube, together with 1 gram of vinyl 1-acetoxyethyl ether and 9 grams of vinyl chloride. The tube was capped with a bottle cap fitted with a polyethylene liner and tumbled in a thermostatted water bath set at 50° C. for 19.5 hours. The tube was then removed from the tumbling bath, cooled in ice water, and the cap punctured with an ice pick, allowing the unreacted vinyl chloride to vent off. In order to coagulate the suspended polymer thereby formed, the tube was placed in Dry Ice to freeze the contents of the tube. The contents were then thawed by placing the tube in lukewarm water, the tube was opened, and the polymer product, which had coagulated from the latex on freezing, was filtered, washed three times with boiling water and then three times with methanol. The polymer product was thereafter placed in a vacuum oven at 60° C. for about 16 hours. In this manner, a solid copolymer of vinyl chloride and vinyl 1-acetoxyethyl ether, containing about 90 percent by weight of polymerized vinyl chloride and about 10 percent by weight of polymerized vinyl 1-acetoxyethyl ether was obtained in a 100 percent conversion. One part by weight of the copolymer was subsequently dissolved in 5 parts by weight of acetone and the resulting solution was used to cast films of the copolymer on panels of glass and bonderized steel in conventional manner. The cast film, upon removal from the glass panel, was flexible and could be bent 180° with a radius of ½ inch or somewhat less. The film cast on the steel panel, on the other hand adhered tenaciously thereto, and could not be removed without tearing. In similar manner, film-forming copolymers were obtained by the independent substitution of vinyl 1-acetoxyethyl ether in the process described above in this example by approximately equal weights of 3-methoxy-1-butenyl 3-methoxy-1-acetoxyethyl ether and 1-propenyl 1-propionoxypropyl ether, whereby copolymers containing approximately 91 to 96 percent by weight of polymerized vinyl chloride, and having a specific viscosity in the range of from 0.10 to about 0.13, were obtained in 40 to 50 percent conversions.

The polymerizable aliphatic ethers employed in the above example were obtained as follows:

A mixture was prepared containing 1778 grams (40.4 moles) of acetaldehyde and 1825 grams (17.9 moles) of acetic anhydride, each component having been cooled prior to admixture to a temperature of 0° C. Another mixture was prepared by adding 9.2 grams of 95 percent sulfuric acid to 603 grams (5.9 moles) of acetic anhydride. At a rate proportional to their volumes, the two mixtures were then fed simultaneously into a glass flask equipped with a stirrer, thermometer and brine-cooled reflux condenser, and which was surrounded by a water bath. An exothermic reaction occurred upon the introduction of the mixture into the flask and the temperature of the reaction mixture rose rapidly to 50° C. With the temperature of the water bath maintained at 20° C. the rates of feed of the two mixtures were adjusted so as to maintain the temperature of the reaction mixture between 45° C. and 50° C. The feeding of the reactants was completed in 45 minutes. The reaction was allowed to continue with stirring for an additional 35 minutes at a temperature maintained between 40° C. and 60° C. The sulfuric acid was then neutralized by the addition of 20 grams of 50 percent aqueous sodium hydroxide, after which the crude reaction product was subjected to fractional distillation under reduced pressure. The still column employed for the distillation was 41 millimeters in diameter, 48 inches in length and packed with 0.16-inch by 0.16-inch protruded packing. The distillation was started under an absolute pressure of 200 millimeters of mercury, and the pressure gradually decreased during the course of the distillation to a minimum pressure of 10 millimeters of mercury. The products from the distillation included 711 grams (16.2 moles) of acetaldehyde and paraacetaldehyde, 801 grams (7.9 moles) of acetic anhydride, 152 grams (2.5 moles) of acetic acid, 560 grams (3.8 moles) of ethylidene diacetate and 1826 grams (9.6 moles) of di(1-acetoxyethyl) ether. The conversion of acetaldehyde was 66.7 percent, while that of acetic anhydride was 66.9 percent. The efficiencies based on acetaldehyde were 79.3 percent to di(1-acetoxyethyl) ether and 15.8 percent to ethylidene diacetate. Based on acetic anhydride, the efficiencies were 60.4 percent to di(1-acetoxyethyl) ether and 24.1 percent to ethylidene diacetate. The di(1-acetoxyethyl) ether product had an indicated purity of more than 99 percent and had the following physical properties: a boiling point of 80° C. at an absolute pressure of 10 millimeters of mercury, a specific gravity of 1.069 at 20/20° C. and a refractive index of 1.4081 at a temperature of 20° C. Corresponding physical property values for the ethylidene diacetate were 60° C., 1.076 and 1.4015, respectively. In similar manner, di(1-acetoxy-3-methoxy-butyl) ether was obtained by the reaction of 3-methoxy-butyraldehyde with acetic anhydride, and di(1-propionoxy-propyl) ether was obtained by the reaction of propionaldehyde and propionic anhydride.

To a 2-liter still kettle, surmounted by a column 40 millimeters in diameter, 36 inches in length, packed with 0.16-inch by 0.16-inch protruded packing, there were charged 952 grams of di(1-acetoxyethyl) ether obtained as described above. Heat was applied to the kettle rapidly enough to cause the contents to boil vigorously at atmospheric pressure. The temperature of the boiling contents of the kettle was 192° C. The still was operated under total reflux for about one-half hour until the vapor temperature descended to 124° C., at which point the removal of distillate was begun. Over a period of 12 hours, a distillate amounting to 822 grams was removed at a head temperature ranging from 122° to 126° C. and at an average reflux ratio of 5 to 1. The final kettle temperature was 198° C. Chemical analysis of the distillate showed an acetic acid content of 31.2 percent by weight as compared with a theoretical value of 31.6 percent by weight. Analysis of the distillate for ester content showed a concentration of 69.0 percent by weight as determined by saponification and 69.8 percent by weight as measured by a determination of unsaturation; the ester in each case was calculated as vinyl-1-acetoxyethyl ether. These results compare with a theoretical value of 68.4 percent by weight, assuming quantitative conversion of di(1-acetoxyethyl) ether to acetic acid and vinyl 1-acetoxyethyl ether. Analysis by saponification of the final kettle residue of 85 grams showed it to consist of 95 percent by weight of di(1-acetoxyethyl) ether. The difference between the charge and the total of the distillate and residue was 45 grams. This material was retained in the column packing and consisted to a mixture of di(1-acetoxyethyl) ether, acetic acid and vinyl 1-acetoxyethyl ether. From the foregoing results, it is apparent that the degree of conversion was about 90 percent and that the efficiency from di(1-acetoxyethyl) ether to vinyl 1-acetoxyethyl ether and acetic acid was substantially quantitative. The distillate was redistilled in a 30-plate, glass Oldershaw column under an absolute pressure of 50 millimeters of mercury and at a reflux ratio of 5 to 1. The first fraction of 130 grams was removed at a head temperature of from 47° to 49.5° C. Of this material, 89 percent by weight was acetic acid and 11 percent by weight was vinyl 1-acetoxyethyl ether. Several intermediate fractions then were removed at a gradually increasing head temperature, each fraction containing a higher concentration of vinyl 1-acetoxyethyl ether and a lower concentration of acetic acid. A final fraction of 300 grams was removed from the still at a head temperature of 58.5° to 59° C. Of this material, 98 percent by weight was vinyl 1-acetoxyethyl ether and 2 percent by weight was acetic acid. The final fraction was redistilled in the presence of an amount of sodium hydroxide equivalent to 120 percent by weight of the contained acetic acid, thereby yielding pure vinyl 1-acetoxyethyl ether having a boiling point of 59° C., at an absolute pressure of 50 millimeters of mercury. The vinyl 1-acetoxyethyl ether product had an indicated purity of 100 percent. In addition the vinyl 1-acetoxyethyl ether product had the following physical properties: a specific gravity of 0.976 and 20/20° C. and a refractive index of 1.4083 at a temperature of 20° C. In similar manner, 3-methoxy-1-butenyl 3-methoxy-1-acetoxybutyl ether was obtained by the pyrolysis of di(1-acetoxy-3-methoxybutyl) ether, and 1-propenyl 1-propionoxypropyl ether was obtained by the pyrolysis of di(1-propionoxypropyl) ether, the reactants being obtained as described above.

What is claimed is:

1. The solid polymer consisting essentially of from about 70 to about 90 percent by weight of polymerized vinyl chloride and from about 1 to about 30 percent by weight of a polymerized compound of the formula:

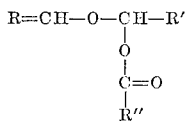

wherein R is selected from the group consisting of the alkylidene and alkoxyalkylidene radicals containing from 1 to 8 carbon atoms, and R' and R" are selected from the group consisting of the alkyl and alkoxyalkyl radicals containing from 1 to 8 carbon atoms.

2. The solid polymer consisting essentially of from about 80 to about 95 percent by weight of polymerized vinyl chloride and from about 5 to about 20 percent by weight of polymerized vinyl 1-acetoxyethyl ether.

3. The solid polymer consisting essentially of from about 80 to about 95 percent by weight of polymerized vinyl chloride and from about 5 to about 20 percent by weight of polymerized 3-methoxy-1-butenyl 3-methoxy-1-acetoxybutyl ether.

4. The solid polymer consisting essentially of from about 80 to about 95 percent by weight of polymerized vinyl chloride and from about 5 to about 20 percent by weight of polymerized 1-propenyl 1-propionoxypropyl ether.

5. A coated article comprising a shaped substrate and a coating thereon comprising a solid polymer consisting essentially of from about 70 to about 99 percent by weight of polymerized vinyl chloride and from about 1 to about 30 percent by weight of a polymerized compound of the formula:

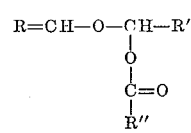

wherein R is selected from the group consisting of the alkylidene and alkoxyalkylidene radicals containing from 1 to 8 carbon atoms, and R' and R" are selected from the group consisting of the alkyl and alkoxyalkyl radicals containing from 1 to 8 carbon atoms.

6. A coated article comprising a shaped ferrous metal substrate and an adherent coating thereon comprising a solid polymer consisting essentially of from about 70 to about 99 percent by weight of polymerized vinyl chloride and from about 1 to about 30 percent by weight of a polymerized compound of the formula:

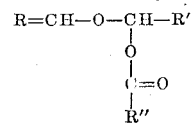

wherein R is selected from the group consisting of the alkylidene and alkoxyalkylidene radicals containing from 1 to 8 carbon atoms and R' and R" are selected from the group consisting of the alkyl and alkoxyalkyl radicals containing from 1 to 8 carbon atoms.

References Cited by the Examiner

UNITED STATES PATENTS

| | | | |
|---|---|---|---|
| 2,016,490 | 10/1935 | Fikentscher | 260—87.5 |
| 2,276,138 | 4/1940 | Alderman et al. | 260—89.1 |
| 2,402,483 | 6/1943 | Adelson et al. | 260—89.1 |
| 2,563,459 | 5/1948 | Ellingboe et al. | 260—87.5 |
| 3,025,280 | 3/1962 | Martin | 260—87.5 |

FOREIGN PATENTS 608,921   3/1946   Great Britain.

OTHER REFERENCES

Losev et al.: Chemical Abstracts 40, 3719, July 10, 1946.

JOSEPH L. SCHOFER, *Primary Examiner.*

LEON J. BERCOVITZ, *Examiner.*

V. A. MORGENSTERN, J. A. DONAHUE,
*Assistant Examiners.*